United States Patent [19]

Kim

[11] 4,127,867
[45] Nov. 28, 1978

[54] VIR HUE CONTROL SYSTEM

[75] Inventor: Seung K. Kim, Portsmouth, Va.

[73] Assignee: General Electric Company, Portsmouth, Va.

[21] Appl. No.: 804,175

[22] Filed: Jun. 6, 1977

[51] Int. Cl.² .......................................... H04N 9/535
[52] U.S. Cl. .................................................. 358/28
[58] Field of Search ........................... 358/10, 27, 28

[56] References Cited

U.S. PATENT DOCUMENTS

| 3,673,320 | 6/1972 | Carnt | 358/28 |
| 3,950,780 | 4/1976 | Freestone | 358/28 |

*Primary Examiner*—John C. Martin

[57] ABSTRACT

An automatic hue control system for a color television receiver using a single sampling of a vertical interval reference (VIR) signal to establish the hue setting of the receiver. A VIR signal periodically appears during a pre-selected line in the vertical blanking interval of a broadcast video signal and includes a chrominance reference portion of such phase that one color difference signal as detected should be zero and another portion having no chroma content. Sampling of the VIR signal during at least a portion of the chrominance reference portion and AC coupling in the control loop enables the loop to respond to any transition in the one color difference signal between chroma reference times and no chroma times. Any such transitions are used to correct the hue setting of the receiver.

9 Claims, 4 Drawing Figures

VIR HUE CONTROL SYSTEM

BACKGROUND OF THE INVENTION

The present invention relates to automatic hue control circuitry for a color television receiver in which a VIR reference signal containing unique hue information is relied upon for automatically establishing hue corrections in a displayed image.

The invention relates to control circuits of the general type set forth in the U.S. Pat. No. 3,950,780 issued to Harry T. Freestone and assigned to the assignee of the present invention. The Freestone patent relies on the proposition, still true today, that when the phase of the chrominance reference portion of the VIR signal is the phase of one color difference signal then at the output of the color difference detector of the television receiver the other color difference signal in quadrature therewith is zero. Thus, if the phase of the chrominance reference is minus (B-Y) then the R-Y color difference signal detector output should be zero, i.e., a null which is the same output that the detector has when no chroma information is transmitted. This unique characteristic permits the use of a feedback control circuit to set the hue of the receiver by automatically adjusting the tint control until the R-Y output of the color difference signal detector is zero during the presence of the VIR signal.

Employing this proposition, the Freestone patent teaches how the problem of drift may be overcome in the process of correcting the hue setting of the receiver in accordance with the VIR signal. Freestone achieves this in one embodiment by double interrogation of the VIR signal; a first interrogation takes place during the chroma reference portion of the VIR signal and a second interrogation takes place during a no chroma portion of the signal. Any difference between these two interrogations, as noted at the R-Y output of the color difference detector is used as a control signal to adjust the hue of the receiver. Any drift in the color difference signal detector output or drift in the reference loop is thereby overcome by the periodic updating of the no chroma reference for the control loop.

The present invention contemplates an improvement over the Freestone invention by single interrogation of the VIR signal in a manner which nevertheless overcomes the drift problems identified by Freestone. By employing a single interrogation, the present invention eliminates the necessity of developing two separate VIR timing pulses, one to identify the chrominance reference portion and another to identify the no chroma portion of the VIR signal required by a double interrogation system.

It is accordingly an object of the present invention to provide an improved automatic hue control circuit for a color television receiver which is essentially insensitive to drift problems.

Another object of the present invention is to employ an automatic hue control circuit utilizing AC coupling to enable single interrogation of the VIR signal.

The automatic hue control system of the present invention comprises a circuit enabled by a single VIR timing pulse for establishing an error signal representing any variation in level of a particular color difference signal, the R-Y signal in the preferred embodiment, from the time when the chrominance reference portion of the VIR signal is present to the time when no chroma content is present. No chroma content time occurs essentially (with the exception of burst) during the remainder of line 19 including the remainder of the VIR signal. This period of no chroma input establishes a quiescent null output from the receiver's color difference detector. The output of the receiver's R-Y color difference signal detector is AC coupled to an AC amplifier so as to be responsive only to the variations in the output of the color difference detector during transition to the chrominance reference portion of the VIR signal from the quiescent no-chroma condition, or to the quiescent condition from the chroma reference condition. Also, because of AC coupling throughout the hue correcting loop, DC drift in the quiescent zero reference level of the detector or DC drift in the power supply to the control loop does not affect the correcting action of the control loop. When a variation from the null condition does appear during the chrominance reference portion of the VIR signal, this variation is amplified by the AC amplifier to correct the phase of the local subcarrier oscillator to reduce the one color difference signal to a null condition. A sample and hold gating circuit, activated by the single VIR timing pulse enables the output of the AC amplifier to vary the operation of the hue control circuit only during a select portion of the VIR signal including at least a part of the chrominance reference portion of the VIR signal.

In accordance with another aspect of the invention, the corrective or control signal output of the AC amplifier is coupled to the subcarrier phase control circuit by means of a preference control circuit. The preference control circuit enables the television receiver to create a condition of offset to the control signal so that the personal hue taste of the viewer is accurately reproduced.

A preference control circuit capable of satisfying this object is described in copending application Ser. No. 663,483 filed Mar. 3, 1976 by Brown and Freestone, now continuation application Ser. No. 821,062, entitled Automatic Hue Control with Preference Capability and assigned to the assignee of the present application. Somewhat different in concept from the Brown and Freestone preference control circuit, the preference control circuit of the present invention operates upon the principle of establishing a fixed control range about the control voltage so that regardless of the amplitude of the control voltage the preference will ride on top thereof and represent a fixed hue change.

It is accordingly another object of the present invention to provide precise viewer preference control for VIR hue correction.

These and other objects of the present invention will be more fully appreciated by means of the detailed description of the invention taken in conjunction with the drawings in which.

DESCRIPTION OF THE PREFERRED EMBODIMENT

Figure 1:
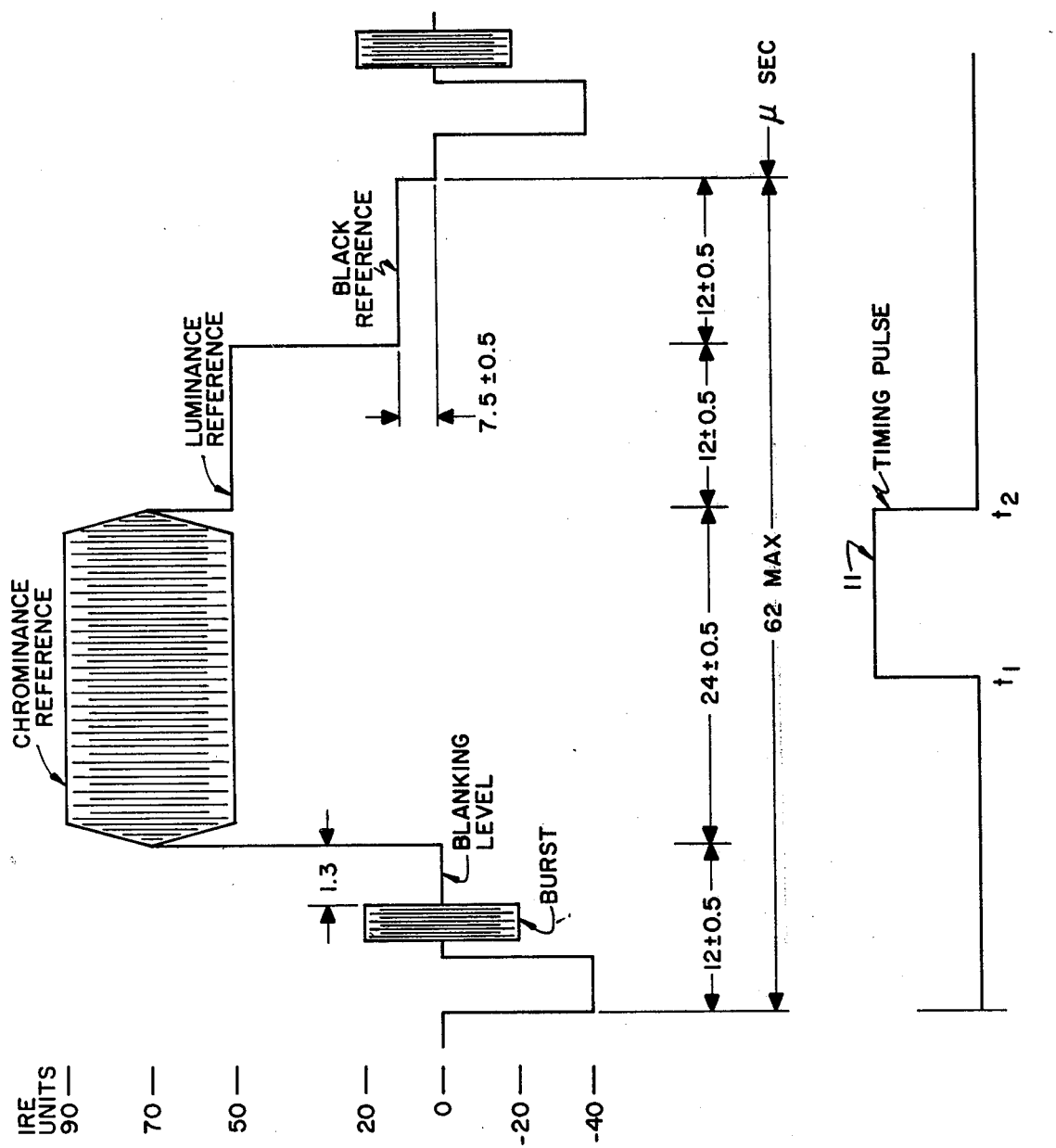
FIG. 1 is a plot of the waveform of the VIR signal and indicates in FIG. 1B the preferred timing of the timing pulse.

Referring now to the drawings, FIG. 1A is essentially a duplicate of FIG. 1A of the aforementioned Freestone patent and explained in detail therein. FIG. 1A shows the format of the VIR signal contained on line 19 in the vertical retrace interval wherein various lines not containing video information may be utilized for such purposes. The VIR signal comprises a horizontal sync pulse of −40 IRE units followed by a burst pulse extending between +20 and −20 IRE units. The burst pulse rests upon a blanking level at zero IRE units. After the burst pulse and 12 microseconds from the beginning of the VIR signal is a chrominance reference portion comprising a 3.58 MH$_z$ subcarrier of such phase that when detected the R-Y color difference signal will be zero. Namely, the phase is such that only B-Y and G-Y information will be detected during this time. This chrominance reference portion is 40 IRE units in amplitude and rests on a luminance reference pedestal of 70 IRE units. The chrominance reference portion extends for approximately 24 microseconds and is followed by a luminance reference portion of 50 IRE units and extending for 12 microseconds. A black level reference portion 7½ IRE units above zero follows the luminance reference portion. The black level reference portion is also 12 microseconds in duration.

FIG. 1B shows the preferred format of the timing pulse 11 which, as will be described below, is utilized to control the operating time of the hue control circuit of the present invention. The period of the timing pulse is such that it includes at least a portion of the chrominance reference portion of the VIR signal and as shown includes the latter portion as a matter of design choice.

Figure 2:
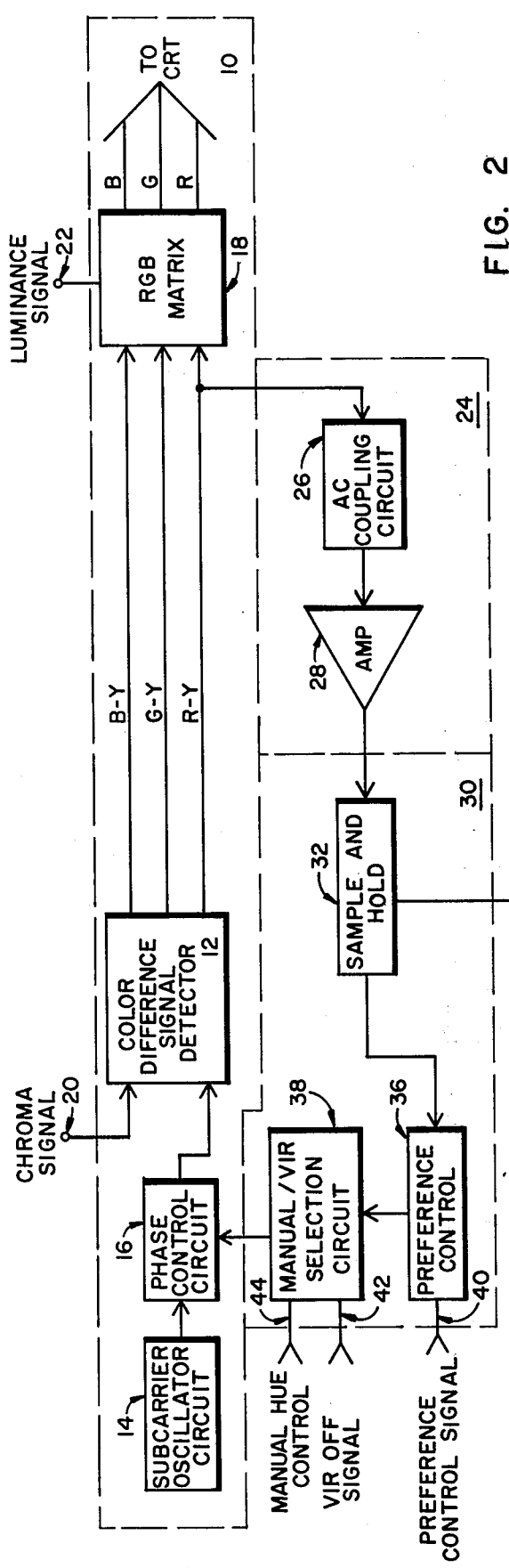
FIG. 2 is a block diagram of a portion of a color television receiver incorporating an automatic hue control circuit in accordance with the present invention.

Referring now to FIG. 2, a portion of a chrominance signal processing section of a color television receiver is indicated generally by the numeral 10. Chrominance signal processing section 10 includes a color difference signal detector 12, subcarrier oscillator circuit 14, phase control circuit 16, and RGB matrix amplifier 18. Color difference signal detector 12 provides color difference signals B-Y, G-Y and R-Y to RGB matrix amplifier 18 in response to a chrominance signal received at terminal 20 and a reconstituted subcarrier received from the series combination of subcarrier oscillator circuit 14 and phase control circuit 16.

As is well known to those skilled in the art, a change in the phase of the reconstituted subcarrier from oscillator circuit 14 by phase control circuit 16 is a means by which the hue setting of the receiver is adjusted in a manual hue control system. The viewer adjusted magnitude of the control signal provided to phase control circuit 16 governs the phase of the reconstituted subcarrier generated by subcarrier oscillator circuit 14 and delivered to color difference detector 12.

The outputs of the color difference signal detector 12 and a luminance signal at terminal 22 are applied to RGB matrix amplifier 18 resulting in an output of red R, green G and blue B color signals. These red, green and blue color signals are then applied to a cathode ray tube (CRT) which is not shown. In some color television designs, RGB matrix amplifier 16 may, in fact, be the CRT itself.

In accordance with the present invention, the R-Y color difference signal from color difference signal detector 12 is applied to AC amplifier means 24. This amplifier responds to and amplifies any variation in the R-Y color difference signal. Color difference signal R-Y is chosen to be fed into AC amplifier means 24 since the VIR signal presently includes a chrominance reference portion of −(B-Y) phase so that the R-Y color difference signal should be at a null during receipt of the chrominance reference portion. Of course, AC amplifier means 24 may be fed with any color difference signal which, during the chrominance reference portion of the VIR signal, is of such phase that that color difference signal is at a null.

AC amplifier means 24 comprises AC coupling circuit 26 in series combination with amplifier 28. AC coupling circuit 26 may, for example, in its simplest form comprise a capacitor which eliminates any DC bias from the output of color difference signal detector 12 and allows only variations in the output of color difference detector 12 to pass on to amplifier 28. Amplifier 28 may, for example, be of the push-pull variety which responds to a positive going R-Y variation with a positive amplified output and responds to a negative going R-Y variation with a negative amplified output. With a periodically reappearing VIR signal containing a chroma reference portion of such phase that the R-Y color difference signal is zero with an adjacent portion having no chroma content whatsoever, correct phasing of subcarrier phase control circuit 16 should result in no variation in the R-Y color difference signal upon transition between the chroma reference portion and the no chroma content portion of the VIR signal regardless of any DC drift in the quiescent zero reference level of detector 12.

The error signal output of amplifier 28 is coupled into control means 30 which, as embodied herein, comprises a sample and hold circuit 32 connected to receive the error signal output from AC amplifier means 24. Sample and hold circuit 32 includes gating means controlled by a VIR timing pulse at terminal 34 to enable the output signal from AC amplifier means 24 to vary the operation of phase control circuit 16 only during a select portion of the VIR signal including at least a part of the chrominance reference portion of the VIR signal.

The output of sample and hold circuit 32, which may be called the VIR control voltage, is fed in closed loop fashion to phase control circuit 16 by preference control circuit 36 and manual/VIR selection circuit 38. The VIR control voltage, when applied to phase control circuit 16, adjusts the phase of the reconstituted subcarrier applied to color difference detector 12.

Preference control circuit 36 allows a viewer-adjusted preference control signal at terminal 40 to reflect a constant viewer-controlled hue variance from the hue control setting established by the VIR signal alone.

Manual/VIR selection circuit 38 allows the control loop to operate during receipt of a video wave which includes a VIR signal and allows for manual hue control during receipt of a video wave which does not include a VIR signal or at the option of the viewer even during receipt of a VIR signal. Simply put, a VIR OFF signal from a VIR presence indication circuit, not shown, indicating that the video wave does not contain a VIR signal allows manual hue control such as by the output of a tint potentiometer at terminal 44 of manual/VIR selection circuit 38 to adjust phase control circuit 16. Absence of a VIR OFF signal at terminal 42 of manual/VIR selector circuit 38 allows the VIR control signal to adjust phase control circuit 16.

In operation of the embodiment of the present invention illustrated in FIG. 2, the R-Y color difference signal from color difference signal detector 12 is continuously AC coupled by AC coupling circuit 26 to amplifier 28. AC coupling circuit 26 removes any DC component from the color difference signal detector 12 output and allows only variations in the R-Y color difference signal to pass on to amplifier 28. Since the only portion of line 19 that contains chroma information is the chroma reference portion of the VIR signal, AC coupling circuit 26 responds only to the change, if any, between the no chroma quiescent output level of the R-Y signal from the color difference signal detector 12 and the level of this R-Y signal during the chroma reference portion. This variation appears as a positive or negative going pulse as applied to subcarrier phase control circuit 16. The affect of burst on the quiescent condition is discussed with regard to FIG. 3 below.

Correctly adjusted by phase control circuit 16, the signal from subcarrier oscillator circuit 14 demodulates the chroma signal delivered to color difference detector 12 in a manner which results in no R-Y color difference signal during the chrominance reference portion of the VIR signal and, hence, no variations occur in the R-Y signal during the transition immediately between the chroma reference portion of the VIR signal and those portions of the VIR signal before and after the chroma reference portion.

The DC independent error signal from amplifier 28 is sampled and held in sample and hold circuit 32. Since there is no output from AC amplifier means 24 except during a variation in the value of the R-Y signal from detector 12, the output of AC amplifier means 24 needs to be sampled only once during each line in which a VIR signal appears. The interval of sampling is not critical except that the interval must encompass a select portion of the VIR signal including at least a part of the chrominance reference portion of the VIR signal. Suitable intervals may include a select portion of the VIR signal extending from slightly before until slightly after the chrominance reference portion, a select portion precisely including only the entire chrominance reference portion, a select portion including only a section of the chrominance reference portion, or a select portion including a section of the chrominance reference portion and a section of the no chroma portion of the VIR signal. As will be explained with reference to FIG. 3, the minimal variation caused by burst is avoided by filtering so that the output of the R-Y detector is at a quiescent null condition both before and after the chroma reference portion of the VIR signal.

The single interrogation of the VIR signal undertaken by sample and hold circuit 32 eliminates any requirements to precisely identify both the chrominance reference portion of the VIR signal and a specific no chroma content portion of the VIR signal such as the black level reference portion of a VIR signal.

The output of AC amplifier means 24 is sampled by the gating action of sample and hold circuit 32. This output is stored in sample and hold circuit 32 over a multiple number of frames of VIR signals to generate the VIR control voltage which is fed back in closed loop fashion to phase control circuit 16 by preference control circuit 38. Specific circuitry suitable for employment as sample and hold circuit 32, preference control circuit 36 and manual/VIR selection circuit 38 is described below with respect to FIG. 3.

The VIR control voltage from sample and hold circuit 32 when applied to phase control circuit 16 adjusts the phase of the reconstituted subcarrier from subcarrier oscillator circuit 14 in a servo loop fashion in a manner which tends to result in the generation of no variations in the R-Y component of the VIR signal from color difference signal detector 12.

Figure 3:
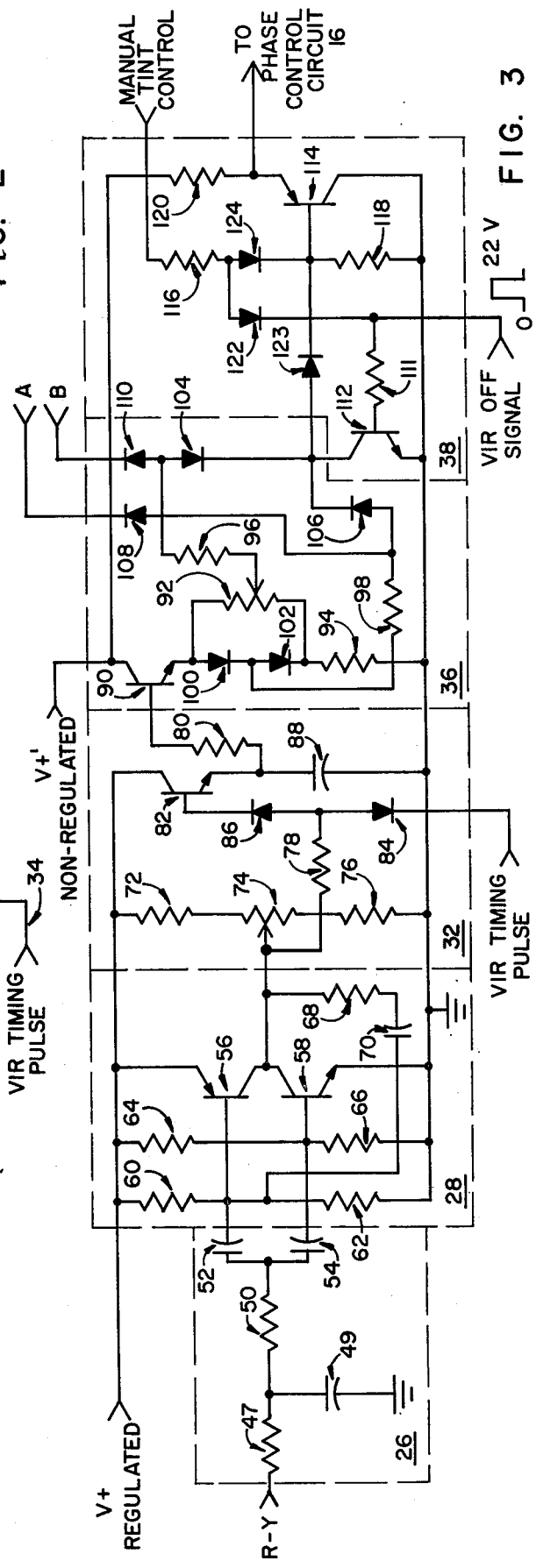
FIG. 3 is a circuit diagram of one embodiment of a portion of the automatic hue control circuit disclosed in FIG. 2.

Turning now to FIG. 3, there is shown an embodiment of the present invention in which AC coupling circuit 26 is illustrated as comprising an input filter responsive to the R-Y output. This filter includes resistor 47 and capacitor 49 connected to ground to provide low pass filtering. This action eliminates fast transitions in the R-Y output such as would be caused by the short duration burst, but passes the longer duration chroma reference portion of the VIR signal. Resistor 50 is connected in series with the filter and the parallel combination of capacitors 52 and 54. Capacitors 52 and 54 are, in turn, connected to the input of amplifier 28 which is illustrated as a push-pull amplifier comprising transistors 56 and 58, resistors 60, 62, 64, 66 and 68, and capacitor 70. Capacitor 52 is connected to the base of transistor 56 while capacitor 54 is connected to the base of transistor 58, the collectors of the transistors being interconnected. The emitter of transistor 56 is coupled to a regulated voltage supply V+ and the emitter of transistor 58 is coupled to ground. Biasing resistor 60 is positioned between the regulated voltage source V+ and the base of transistor 56 while biasing resistor 62 is positioned between the base of transistor 56 and ground. Biasing resistor 64 is positioned between the base of transistor 58 and the regulated voltage source V+ while biasing resistor 66 is positioned between the base of transistor 58 and ground. Resistors 60, 62, 64 and 66 thus provide base biasing to transistors 56 and 58.

The output of push-pull amplifier 28 appears at the common collector junction of transistors 56 and 58. Resistor 68 and capacitor 70 are series coupled between the common collector junction of transistors 56 and 58 and the base of transistor 56.

In accordance with the embodiment of the present invention illustrated in FIG. 3, sample and hold circuit 32 is illustrated as comprising resistors 72, 74, 76, 78 and 80, transistor 82, diodes 84 and 86, and capacitor 88. Resistors 72, 74 and 76 are series-connected between the regulated voltage source V+ and ground with a variable tap point on resistor 74 coupled to the common collector junction of transistor 56 and 58.

The tap point of resistor 74 is coupled to the base of transistor 82 through the series combination of resistor 78 and diode 86. The collector of transistor 82 is biased by the regulated voltage source V+ while the emitter of transistor 82 is coupled through capacitor 88 to ground. Diode 84 is coupled between the junction of resistor 78 and diode 86 to receive a single VIR timing pulse, as will be explained below. The emitter of transistor 82 is also coupled through resistor 80 to preference control circuit 36.

In the embodiment of the present invention disclosed in FIG. 3, preference control circuit 36 is illustrated as comprising transistor 90, resistors 92, 94, 96 and 98, and diodes 100, 102, 104, 106, 108 and 110. The base of transistor 90 is coupled to resistor 80 of sample and hold circuit 32, the collector of transistor 90 is biased by a non-regulated voltage source V+′ and the emitter of transistor 90 is connected through the series combination of diode 100, diode 102 and resistor 94 to ground. Resistor 92 is positioned in parallel with diodes 100 and 102 between the emitter of transistor 90 and resistor 94. Resistor 96 and diode 104 are series-connected between a tap point of resistor 92 and the output of preference control circuit 36. Resistor 98 and diode 106 are connected in series combination between the junction of diodes 100 and 102 and the output of preference control circuit 36. Diode 108 is coupled between the junction of resistor 98 and diode 106 and a source of timing pulse A, whereas diode 110 is connected between the junction point of resistor 96 and diode 104 and a source of timing pulse B. The output of preference control circuit 36 is coupled to manual/VIR selection control circuit 38.

In accordance with the embodiment of the present invention illustrated in FIG. 3, manual/VIR selection circuit 36 comprises transistors 112 and 114, resistors 111, 116, 118 and 120 and diodes 122, 123 and 124. The output of preference control circuit 36 at diodes 104 and 106 is coupled to the base of transistor 114 by diode 123, the collector of transistor 114 being connected to ground and the emitter thereof being biased by unregulated voltage supply V+' through resistor 120. The output to phase control circuit 16 is provided at the emitter of transistor 114. The collector of transistor 112 is also coupled to the output of preference control circuit 36 at diodes 104 and 106 while the emitter of transistor 112 is coupled to ground and the base of transistor 112 is coupled to receive a VIR OFF signal. Resistor 118 is connected between the base of transistor 114 and ground while diode 124 is connected in series between the base of transistor 114 and resistor 116, the other end of resistor 116 being available for receipt of a manual tint control signal. Diode 122 is positioned between the junction of resistor 116 and diode 124 and the base of transistor 112 by means of resistor 111.

In operation of the embodiment of the present invention illustrated in FIG. 3, an R-Y color difference signal, such as from color difference signal detector 12 of FIG. 2, is applied to resistor 50 of AC coupling circuit 26 by means of the resistor 47, capacitor 49 low pass filter. All DC components of the R-Y signal appearing at resistor 50 are removed by capacitors 52 and 54. As a consequence, only variations in the R-Y signal from color difference signal detector 12 are passed on to amplifier 28.

Amplifier 28 is of a push-pull variety whereby positive going variations in the R-Y color difference signal appearing at capacitors 52 and 54 turn on transistor 58 and negative going transient variations in the R-Y color difference signal appearing at capacitors 52 and 54 turn on transistor 56. As a consequence, variations in the R-Y signal appear as positive or negative pulses at the common collectors of transistors 56 and 58.

The series combination of resistor 68 and capacitor 70 between the common collectors of transistors 56 and 58 and the base of transistor 56 is employed to decrease the discharge time of capacitor 52. Capacitor 52 must discharge fast enough to settle to the output level of color difference signal detector 12 by line 19 after possible receipt of VIT color information on line 18 of the vertical blanking interval. This assures that only transient variations in the chrominance reference portion of the VIR signal are passed by capacitors 52 and 54 to transistors 56 and 58. When transistor 56 is turned on by a negative going transient R-Y signal, the collectors of transistor 56 and 58 are pulled toward the regulated supply voltage V+, whereas when transistor 58 is turned on by a positive going transient R-Y color difference signal, the collectors of transistors 56 and 58 are both pulled toward ground.

The collectors of transistors 56 and 58 provide a source of current supply to storage capacitor 88 through resistor 78, diode 86 and the base-emitter junction of transistor 82. Accordingly, when transistor 56 is turned on, current is drawn through transistor 56 from the regulated source V+ through resistor 78, diode 86 and transistor 82 to charge capacitor 88. On the other hand, when transistor 58 is turned on, the collectors of transistors 56 and 58 are pulled toward ground, back-biasing diode 86 and preventing any additional charge to be added to capacitor 88 allowing this capacitor to discharge through the circuit of transistor 90. Thus, a negative R-Y variation operates to provide increased charge to capacitor 88 while a positive going variation in the R-Y color difference signal operates to prevent additional charging of capacitor 88.

Push-pull amplifier circuit 28 is allowed to control the charging of capacitor 88 only during a select portion of the VIR signal controlled by a single VIR timing pulse supplied to back-bias diode 84. During all other times, diode 84 is forward biased in a manner which causes all current provided by transistors 56 and 58 to be drawn off through diode 84. As discussed above, the interval of the single VIR timing pulse supplied to diode 84 is not critical provided the interval includes at least a part of the chrominance reference portion of the VIR signal.

Resistors 72, 74 and 76 establish an operating voltage for amplifier 28 as well as establishing a nominal null condition for phase control circuit 16. The tap point on resistor 74 is selected to provide approximately the required voltage across capacitor 88 to establish a phase control for subcarrier phase control circuit 16 which results in a null output from the R-Y color difference signal. It is, however, important to realize that this tap point need provide only an approximation of the required voltage and that drift in the regulated voltage supply V+ creates no resultant error in the closed loop circuit since, regardless of the precise value obtained at the tap point of resistor 74, the closed loop will seek to establish a voltage on capacitor 88 which results in a null at the R-Y output.

For example, ignoring preference control circuit 36 and manual/VIR selection circuit 38 for the moment and assuming that resistor 80 couples the voltage across capacitor 88 directly to phase control circuit 16 closing the VIR control loop, it may be assumed that ten volts is required to be charged across capacitor 88 to establish a phase of the subcarrier which results in a zero R-Y color difference signal from detector 12 during the chrominance reference portion of the VIR signal. Variation in the regulated voltage supply source V+ at a time when diode 84 is not back-biased by a single VIR timing pulse has no effect on the charge of capacitor 88 because the current through resistor 78 from the regulated source V+ drained off to ground through diode 84. However, during receipt of a VIR timing pulse which back-biases diode 84, the charge on capacitor 88 is in the first instance affected by the voltage appearing at the tap point of resistor 74. If, for example, this voltage has increased due to upward drift of the regulated voltage supply V+ in a manner which results in too great a voltage across capacitor 88, this immediately results in a positive going R-Y variation signal turning transistor 58 on and driving the potential at the tap point of resistor 74 toward ground until the charge on capacitor 88 decreases to a point at which there is no variation in the R-Y signal and both transistors 56 and 58 are turned off. In a similar manner, if for any reason the charge on capacitor 88 is too low resulting in a negative going R-Y color difference signal, such a signal results in the turning on of transistor 56 to provide an increased charge on capacitor 88.

It should be noted that capacitor 88 is continously discharging between VIR signals and is therefore repeatedly charged by the current supply at the tap point of resistor 74 as supplemented by the operation of transistors 56 and 58. In effect, the discharging of capacitor 88 and subsequent charging by amplifier 28 operates as a servo system seeking to obtain a charge across capacitor 88 which results in elimination of variations in the R-Y color difference signal. As a consequence, phase control circuit 16 is continually adjusted in accordance with the present invention by the employment of a single non-critically positioned VIR timing pulse and is independent of any DC drift in the color difference signal detector output and drift within the circuit itself and its supply voltage.

Turning now to the operation of preference control circuit 36, the voltage across capacitor 88 is supplied across the series combination of diode 100, diode 102 and resistor 94 by resistor 80 and emitter follower transistor 90. Thus, any variation in the charge stored in capacitor 88 is reflected in the voltage drop across resistor 94. This voltage is delivered to the output of the preference control circuit in two different manners depending upon timing pulses appearing at terminals A and B. The timing pulse appearing at terminal A which may include at least a portion of line 19 of the vertical interval and which back biases diode 108 to allow the voltage developed at the junction of diodes 100 and 102 to appear through a first path comprising resistor 98 and diode 106 at the output of preference control circuit 36 and, upon passage through manual/VIR selection circuit 38, to control the phase of the subcarrier through phase control circuit 16. Diode 106 and resistor 98 thereby provide a first circuit for the error signal established across capacitor 88 which is operative during VIR time. The two diodes 100 and 102 establish a fixed voltage for preference offset and by coupling the error signal from the junction between these diodes, a center point is established for preference control above and below this center point.

Resistor 92 constitutes resistive means parallel to diodes 100 and 102 and provides a second circuit for the error signal across capacitor 88. The tap point on resistor 92 can be adjusted to develop a variation in the error signal from capacitor 88 by a constant amount. Accordingly, when the tap point on resistor 92 is set close to the emitter of transistor 90, a constant voltage is added to the stored error signal appearing at the junction of diodes 100 and 102 whereas when the tap point of resistor 92 is moved toward resistor 94 the error signal is decreased by a constant amount. A timing signal at terminal B back-biases diode 110 during that portion of a broadcasted video wave which does not contain a VIR signal and thereby creates a second path which allows the error signal to be adjusted by a constant amount determined by the position of the tap point on resistor 92. This adjusted error signal passes on through manual/VIR selection circuit 38 to phase control circuit 16.

The precise intervals encompassed by the timing pulses A and B are not critical, except that diode 108 must be back-biased during the select portion of the VIR signal encompassed by the single VIR timing pulse applied to diode 84 to assure that the R-Y color difference signal received by AC coupling circuit 26 is not artifically varied due to the introduction of an additional constant voltage by preference control circuit 36. In addition, timing pulse B must back-bias diode 110 during the complete video portion of the received broadcast signal to assure that the adjusted error signal effects control of the hue setting of receiver at all times the broadcasted signal is visible to the viewer.

It should be pointed out that the amount of preference offset to the error signal appearing across capacitor 88 is constant regardless of the voltage across capacitor 88 established by the operation of the control loop. This is critical for receivers in which the amount of hue variation introduced by phase control circuit 16 is a linear function of the control voltage applied to phase control circuit 16.

In accordance with the present invention, the preference control circuit provides a first path for the error signal which is operative during receipt of a VIR signal to pass the error signal unchanged to the pass control circuit 16, and a second voltage path for the error signal which is operative during no receipt of a VIR signal and comprises resistive means in parallel with fixed voltage drop means to establish a constant amount of variation in the error signal selectively adjustable by a viewer but totally independent of the actual magnitude of the error signal.

Turning now to the operation of manual/VIR selection circuit 38, the output of preference control circuit 36 can be selectively directed to ground by the appearance of a VIR OFF signal at the base of transistor 112. One instance in which a VIR OFF signal is required at the base of transistor 112 is during receipt of a broadcast video signal which does not contain a VIR signal. Another instance in which transistor 112 is turned on to drive the output of preference control circuit 36 to ground is when, even though a VIR signal is received, a viewer desires to override the automatic control capabilities of the VIR hue control system. In such an instance, a viewer generated VIR OFF signal appearing at the base of transistor 112 clamps the output of preference control circuit 36 to ground and disables the operation of the VIR hue control system. Without a VIR OFF signal at the base of transistor 112 the output from preference control circuit 36 passes to the base of transistor 114 and is effectively communicated to control circuit 16 at the emitter of transistor 114.

When transistor 112 is turned on, diode 123 is back-biased and diode 122 is back-biased by the 22 volt VIR OFF signal at the base of transistor 112, so that the output at the emitter of transistor 114 is governed entirely by the magnitude of the manual tint control signal appearing at resistor 116. This manual tint control signal is a viewer-controlled voltage signal as has been regularly employed in color television receivers prior to the introduction of VIR control systems. When the VIR OFF signal is not present, zero volts appears at the base of transistor 112 and diode 122 is forward biased which reverse biases diode 124 to disable the manual tint control. Now, the error signal from preference control circuit 36 is applied to the base of transistor 114 by diode 123.

While a particular embodiment of the present invention has been shown and described, it will be obvious to those skilled in the art that certain advantages and modifications may be effected without departing from the spirit of the invention, and accordingly, it is intended that the scope of the invention not be determined by the foregoing examples but only by the scope of the appended claims.

What is claimed and desired to be secured by Letters Patent of the United States is:

1. In a color television receiver an automatic hue control circuit responsive to a periodically occurring VIR signal included in the received video, wave, said VIR signal containing a chroma reference portion of such phase that one color difference signal as detected is at a null and another portion of no chroma content adjacent said chroma reference portion, said automatic hue control circuit comprising:

chroma processing means responsive to said video wave to provide a null output during said no chroma content portion and a chroma reference output during said chroma reference portion, AC control loop means responsive only to any change between the chroma reference output and the null output of said chroma processing means to provide a hue control signal, said AC control loop means including timing means responsive to a single timing pulse occurring during the presence of said VIR signal and including at least a portion of said chroma reference portion, said timing means enabling said AC control loop means to provide said hue control signal during the period of said timing pulse, and hue control means responsive to said hue control signal to adjust the hue of said receiver until said change is reduced to zero.

2. The invention recited in claim 1 wherein said AC control loop means includes a complementary amplifier responsive to change between said null output and said chroma reference output of both positive and negative polarities.

3. The invention recited in claim 2 wherein said AC control loop means further includes time constant means coupled to said chroma processing means to eliminate short duration variations in the output of said chroma processing means.

4. The invention recited in claim 1 wherein said timing means comprises sample and hold circuit means including storage means, said sample and hold circuit means coupling said hue control signal to said storage means during the period of said timing pulse.

5. The invention recited in claim 4 wherein said AC control loop means contains preference control means including first circuit means operative during periods of receipt of the VIR signal to couple said stored hue control signal to said hue control means and second circuit means operative during the periods when said VIR signal is not present to vary said stored hue control signal as coupled to said hue control means by a viewer-adjusted constant amount.

6. In a color television receiver an automatic hue control circuit responsive to a periodically occurring VIR signal included in a received video wave, said VIR signal containing a chroma reference portion of such phase that one color difference signal is at a null and another portion having no chroma content, said automatic hue control circuit comprising:

chroma processing means responsive to said video wave for detecting said one color difference signal and providing when said VIR signal is present a null output during said no chroma content portion and a chroma reference output during said chroma reference portion, AC amplifier means AC coupled to receive said one color difference signal as detected by said chroma processing means to develop a variations signal in reference to variations in said one color difference signal, gating means coupled to said AC amplifier means for single interrogation of said variations signal during a select portion of said VIR signal including at least a part of said chrominance reference portion, means for storing said interrogated variations, signal, and hue control means responsive to said stored variations signal to adjust the hue setting of said color television receiver until variations between the chroma reference output and the null output of said chroma processing means are essentially zero.

7. The invention recited in claim 6 wherein said hue control means includes preference control means including viewer-adjustable means for varying said stored variations signal by a constant amount during the periods when the VIR signal is not present.

8. In a color television receiver, an automatic hue control circuit responsive to a VIR signal when present in the received video wave, said automatic hue control circuit comprising:

chroma processing means responsive to said video wave, control means responsive to changes in the output of said chroma processing means to develop an error signal, said control means including gating means to sample and store said error signal, the sampling period occurring during receipt of said VIR signal and including at least a portion of the chroma reference portion of said VIR signal, hue control means coupled to said chroma processing means and responsive to said stored error signal to adjust the hue of said receiver to reduce said stored error signal to a minimum, and preference control means coupling said gating means to said hue control means and including first circuit means operative during periods of receipt of said VIR signal to apply said stored error signal to said hue control means and second circuit means operative during the periods when said VIR signal is not present to vary said stored error signal as applied to said hue control means by a viewer-adjusted constant amount.

9. The invention recited in claim 8 wherein the second circuit means of said preference control means include means to develop a constant voltage above and below the level of said stored error signal and means for selecting a portion of said constant voltage, said second circuit means applying said stored error signal as varied by a viewer-selected portion of said constant voltage to said hue control means during the periods when said VIR signal is not present.

* * * * *